(No Model.)
R. J. BOLE.
CIRCULAR SAW.
No. 424,263. Patented Mar. 25, 1890.
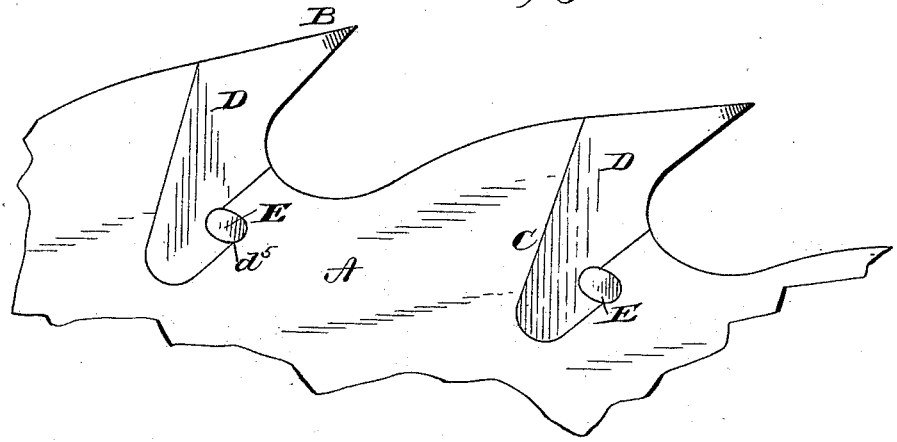
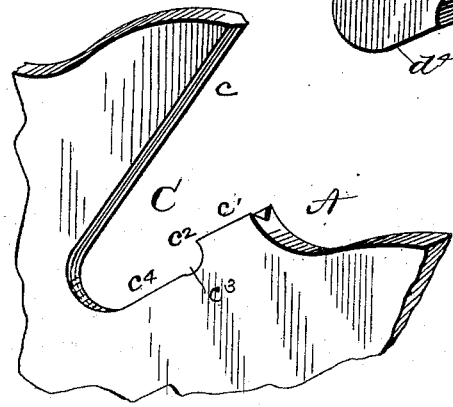
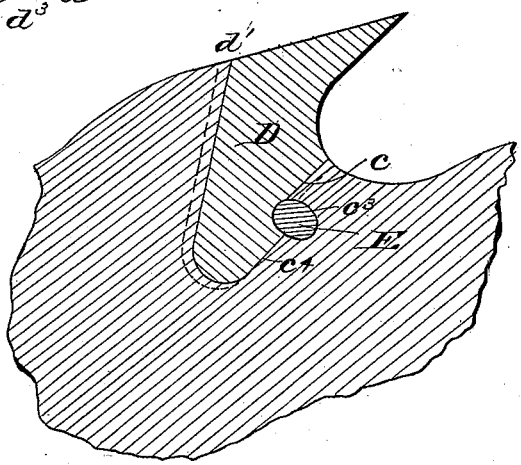
WITNESSES:
F. L. Ourand
C. F. Chisholm
INVENTOR:
Robert J. Bole
by Saml Dagger &Co
Attorneys

UNITED STATES PATENT OFFICE.

ROBERT J. BOLE, OF BEAVER FALLS, PENNSYLVANIA, ASSIGNOR TO THE CHAMPION SAW COMPANY, (LIMITED,) OF SAME PLACE.

CIRCULAR SAW.

SPECIFICATION forming part of Letters Patent No. 424,263, dated March 25, 1890.

Application filed August 17, 1889. Serial No. 321,061. (No model.)

*To all whom it may concern:*

Be it known that I, ROBERT J. BOLE, a citizen of the United States, and a resident of Beaver Falls, in the county of Beaver and State of Pennsylvania, have invented certain new and useful Improvements in Circular Saws; and I do hereby declare that the following is a full, clear, and exact description of the invention, which will enable others skilled in the art to which it appertains to make and use the same.

My invention relates to improvements in circular saws, and relates especially to the teeth of this character of saws.

In circular saws in general use many defects have been found to exist, some of which are the peculiar shape and arrangement of the teeth, which throw the strain on the circumference of the saw, thereby often causing buckling; also, the size of the teeth requires a large portion of the rim of the saw to be removed, thus weakening the saw; and also, the size of the teeth in general use is such as to prevent the insertion of a sufficient number to adapt the saw for heavy feed.

The object of my invention is the production of a saw-tooth which will overcome these objections, first, by fastening the tooth in such manner that the strain will be brought on the diameter of the saw; second, by providing a tooth which will occupy a small amount of space in the rim of the saw, and, third, to provide a saw which will be simple, durable, and inexpensive.

To attain the desired objects, the invention consists of the saw and tooth illustrated, described, and claimed herein.

Figure 1 represents a side elevation of a saw embodying my invention. Fig. 2 represents a perspective view of a part of the rim of the saw and the tooth detached, and Fig. 3 represents a longitudinal sectional view through one of the teeth.

Referring to the drawings, A designates a portion of the saw; B, the rim thereof provided with the recesses or openings C to receive the teeth D. The rear wall $c$ of the recesses C is beveled to fit in a corresponding groove in the tooth, and the front wall $c'$ is provided with a beveled groove and projects inward at $c^2$, and below the projection is cut out at $c^3$, and is smooth at $c^4$.

The tooth D has its rear wall $d$ and lower end formed with a beveled groove $d'$, which receives the correspondingly-beveled wall $c$ of the recess, and a portion of the front wall $d^2$ of the tooth is beveled to enter the beveled groove of the projection $c^2$, and the tooth is cut out below the portion $d^2$, as at $d^3$, to form, in connection with the cut-out portion $c^3$, an opening $d^5$, and the tooth is smooth at $d^4$ to fit in the smooth portion $c^4$ of the recess, and in the opening $d^5$ is inserted a rivet E for fastening the tooth in position.

It will thus be seen that I provide a tooth of simple construction, which may be readily and easily detached, which will be firmly retained, and which is thoroughly efficient for the purposes intended.

Having thus described my invention, what I claim as new, and desire to secure by Letters Patent, is—

In a saw, the combination with a saw having the recess C, and the inwardly-projecting lip $c^2$, provided with a beveled groove, the cut-out-portion $c^3$ below said lip, the smooth portion $c^4$, and beveled rear wall, of the tooth D, fitting in the recess C and having a curved cut-out portion forming an opening, in connection with the cut-out portion of the tooth-recess, and the rivet fitting in the opening thus formed, substantially as described.

In testimony that I claim the foregoing as my own I have hereunto affixed my signature in presence of two witnesses.

ROBERT J. BOLE.

Witnesses:
   J. F. MERRIMAN,
   FRANK NAIR.